(12) United States Patent
Cook

(10) Patent No.: US 7,556,389 B2
(45) Date of Patent: Jul. 7, 2009

(54) POINTABLE OPTICAL SYSTEM WITH COUDE OPTICS HAVING A SHORT ON-GIMBAL PATH LENGTH

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 369 days.

(21) Appl. No.: 11/394,312

(22) Filed: Mar. 30, 2006

(65) Prior Publication Data

US 2007/0229994 A1    Oct. 4, 2007

(51) Int. Cl.
*G02B 5/10* (2006.01)
*G02B 26/08* (2006.01)

(52) U.S. Cl. .................. 359/859; 359/225; 359/226

(58) Field of Classification Search .................. 359/223, 359/225, 226, 366, 729, 731, 858, 859, 861
See application file for complete search history.

(56) References Cited

U.S. PATENT DOCUMENTS

| | | | | |
|---|---|---|---|---|
| 3,674,334 A | * | 7/1972 | Offner | 359/366 |
| 3,845,483 A | * | 10/1974 | Soma et al. | 343/761 |
| 4,471,448 A | * | 9/1984 | Williams | 356/139.04 |
| 4,525,719 A | * | 6/1985 | Sato et al. | 343/761 |
| 4,655,592 A | * | 4/1987 | Allemand | 356/237.3 |
| 4,883,348 A | | 11/1989 | Spivey et al. | |
| 5,115,355 A | | 5/1992 | Dunn | |
| 5,204,785 A | | 4/1993 | Tang et al. | |
| 5,239,404 A | * | 8/1993 | McLaughlin et al. | 359/226 |
| 5,309,276 A | * | 5/1994 | Rodgers | 359/366 |
| 5,363,235 A | | 11/1994 | Kiunke et al. | |
| 5,386,316 A | * | 1/1995 | Cook | 359/365 |
| 5,631,770 A | * | 5/1997 | Jarmuz | 359/351 |
| 6,061,033 A | * | 5/2000 | Hulderman et al. | 343/781 CA |
| 6,174,061 B1 | * | 1/2001 | Cooper | 359/857 |
| 6,849,841 B2 | | 2/2005 | Byren et al. | |
| 6,969,176 B2 | * | 11/2005 | Pohle | 359/856 |
| 6,970,286 B1 | * | 11/2005 | Kunick | 359/366 |

OTHER PUBLICATIONS

"Agile beam director system design: ROBS/TCATS optical tracker" Neff, B.W. et all, Jul. 1999, SPIE-INT XP002443544, pp. 402-412.
W.L. Casey et al., "Representative pointed optics and associated gimbal characteristics", SPIE vol. 887, Acquisition, Tracking and Pointing II (1988), pp. 116-123.

* cited by examiner

*Primary Examiner*—Ricky D Shafer
(74) *Attorney, Agent, or Firm*—Leonard A. Alkov

(57) ABSTRACT

A coude gimbal structure includes a two-axis gimbal system having an outer gimbal pivotable about a first rotational axis, and an inner gimbal supported on the outer gimbal and pivotable about a second rotational axis which intersects the first rotational axis at an intersection point. A folded afocal three-mirror anastigmat has a positive-optical-power primary mirror, a negative-optical-power secondary mirror, and a positive-optical-power tertiary mirror, and a first flat fold mirror, and a second flat fold mirror. A beam path incident upon the primary mirror is reflected from the primary mirror to the secondary mirror. The tertiary mirror lies on the second rotational axis, the first flat fold mirror redirects the beam path reflected from the secondary mirror to the tertiary mirror, and the second flat fold mirror lies at the intersection point and redirects the beam path reflected from the tertiary mirror along the first rotational axis.

8 Claims, 3 Drawing Sheets

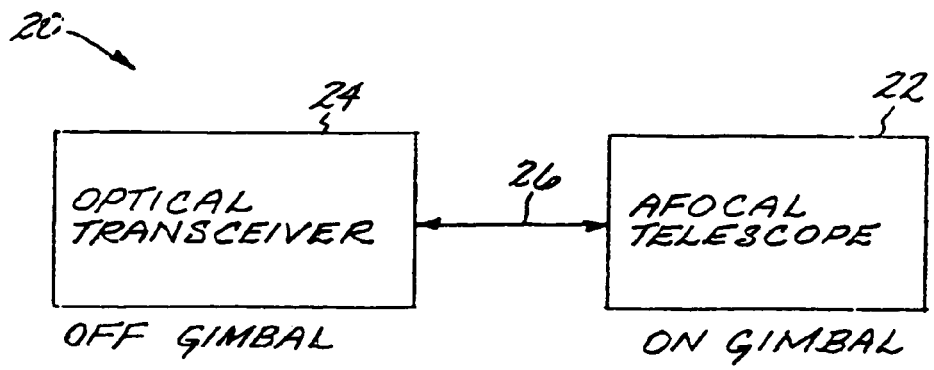
FIG. 1
FIG. 3
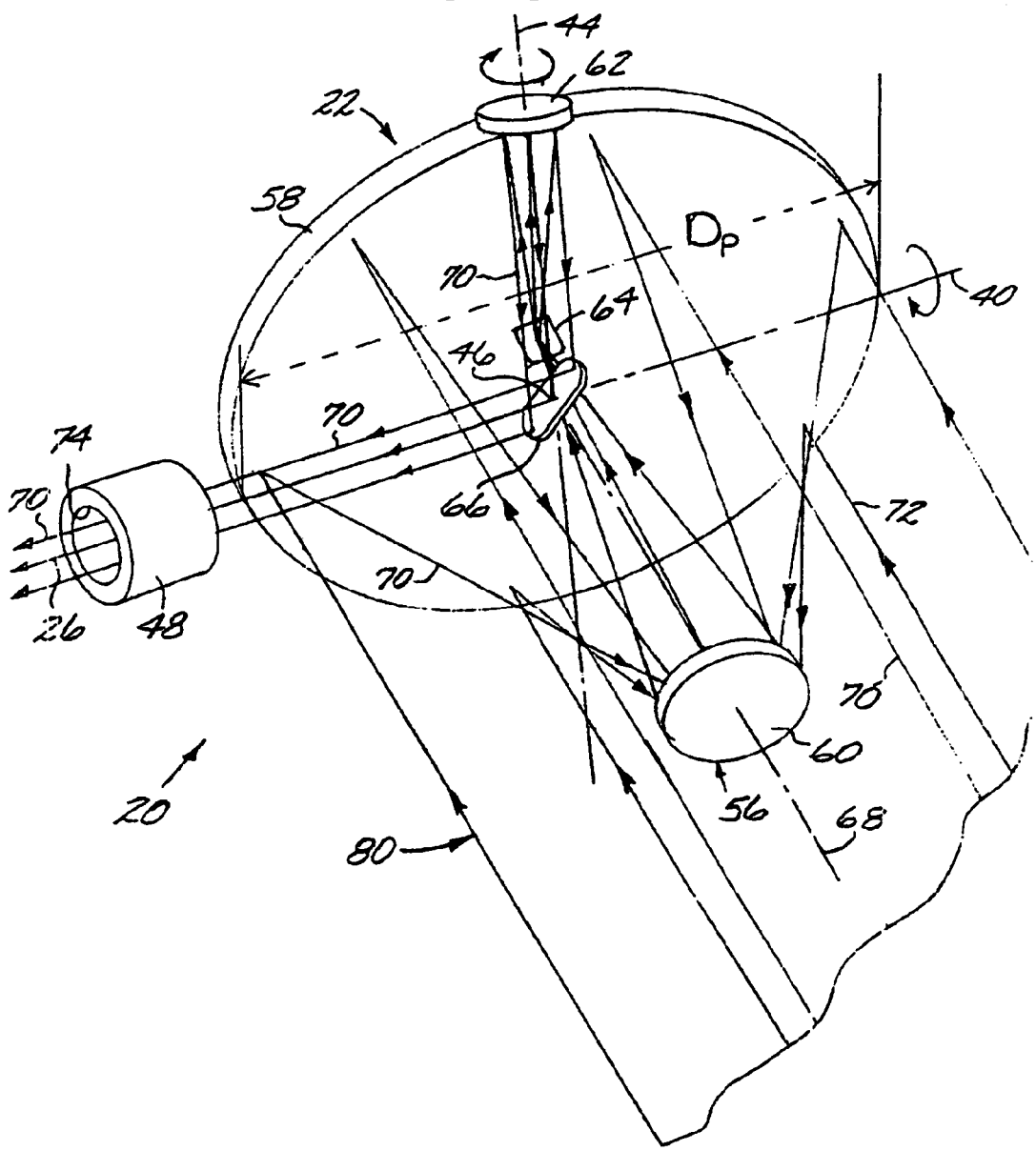

| SURF # | ELEMENT | RADIUS | CONIC | THICKNESS | MATERIAL | DECENTER | TILT ALPHA, DEG. | TILT BETA, DEG. |
|---|---|---|---|---|---|---|---|---|
| 1 | | INF. | | 11.0000 | AIR | | | |
| 2 | PRIMARY (58) | -25.0660 | -1.00164 | -10.1869 | REFL. | | | |
| 3 | SECONDARY (60) | -6.3041 | -2.86734 | 7.3872 | REFL. | 0.05094 | 1.2334 | |
| 4 | INTER. IMAGE | INF. | | -1.7881 | AIR | | | |
| 5 | FOLD 1 (64) | INF. | | -4.4047 | REFL. | | | 45.0000 |
| 6 | TERTIARY (62) | 8.8415 | -0.98029 | 6.1928 | REFL. | 0.68934 | -5.9429 | |
| 7 | | INF. | | -9.0000 | AIR | -0.32865 | -14.1731 | |
| 8 | FOLD 2 (66) | INF | | | REFL. | | 45.0000 | |

NOTES:
FOV OFFSET IS -0.7241 DEG.
ENTRANCE PUPIL IS SURFACE 2; 12 INCH DIAMETER
EXIT PUPIL IS SURFACE 8; 1.094 INCH DIAMETER
AFOCAL MAGNIFICATION IS 10.97X
TOTAL FOV IS 0.25 DEG. DIAMETER
DECENTERS BEFORE TILTS

FIG. 4

POINTABLE OPTICAL SYSTEM WITH COUDE OPTICS HAVING A SHORT ON-GIMBAL PATH LENGTH

This invention relates to an optical system with a gimbaled telescope and, more particularly, to a gimbal structure using a coude reflective optical system to conduct the optical path between the gimbaled and non-gimbaled optical components.

BACKGROUND OF THE INVENTION

In the design of an optical system with a gimbaled telescope, for receiving light, transmitting light, or both, with a significant field of regard, there must be an allocation of the optical functions between on-gimbal components and off-gimbal components. The on-gimbal components are pointed as the telescope points, whereas the off-gimbal components are not pointed as the telescope points. If all of the optical components are mounted on the gimbal structure, their large mass and size may require an unacceptably large gimbal structure. Increasing the on-gimbal mass requires the use of a stronger gimbal structure, larger bearings, and larger drive motors. Also, the maximum slew rate of the gimbal is reduced. For some very large and heavy optical components, such as high-power laser transmitters and cryogenically cooled sensor receivers, it is impractical to mount these components on the gimbal. They therefore must be mounted off-gimbal but to the structure to which the gimbal structure is mounted, such as the airframe of an aircraft or the non-gimbaled structure of a spacecraft.

Where at least some of the optical components are mounted off-gimbal, additional optical components must be provided to conduct the beam path between the components mounted on the gimbal and the components mounted off the gimbal. These additional optical components must be geometrically arranged to transmit the beam path continuously as the gimbaled structure is pivoted about the x and y axes.

One such approach is an arrangement of mirrors termed coude optics. The coude optics typically directs the beam path along the axis of rotation of the gimbal axes, to avoid nutation of the beam path about the inner and outer gimbal pivots. Existing approaches to coude optics work well for astronomical applications, where the field of view of the optical system is relatively small. However, a larger field of view and field of regard is normally required for surveillance and other applications. The available coude optics is much less successful for these applications requiring a larger field of view. The result is a tendency to place more of the optical components onto the gimbal structure than would otherwise be desirable from the standpoint of the mechanics of the gimbal structure.

Accordingly, there is a need for an improved approach to communicating the beam path between the on-gimbal and the off-gimbal components, particularly for optical systems requiring a larger field of view and larger field of regard. The present invention fulfills this need, and further provides related advantages.

SUMMARY OF THE INVENTION

The present invention provides a coude gimbal structure incorporating coude optics tailored to permit a wide-field-of-view beam path to be communicated between the on-gimbal and the off-gimbal optical components. The approach may be used for beam-transmitting optical devices (e.g., laser transmitting devices), beam-receiving optical devices (e.g., sensor and surveillance systems), or devices that have both transmitting and receiving capabilities. The present coude optics design has a short on-gimbal optical path length, limiting the amount of beam spreading that occurs. Consequently, a wider field of view than possible with other coude optical systems is practical with the present approach. Although the primary application is in ultraviolet, visible, or infrared light optical systems, the present approach is more generally applicable, for example for use with signals in other portions of the electromagnetic spectrum, such as radio frequency signals.

In accordance with the invention, a coude gimbal structure comprises a two-axis x-y gimbal system including an outer gimbal pivotable about a first rotational axis, and an inner gimbal supported on the outer gimbal and pivotable about a second rotational axis which is perpendicular to the first rotational axis and which intersects the first rotational axis at an intersection point. The coude gimbal structure further includes a folded afocal three-mirror anastigmat having a positive-optical-power primary mirror, a negative-optical-power secondary mirror, and a positive-optical-power tertiary mirror, a first flat fold mirror, and a second flat fold mirror. The primary mirror and the secondary mirror lie substantially on a third axis passing through the intersection point and lying perpendicular to the first rotational axis and perpendicular to the second rotational axis. A beam path parallel to the third axis is reflected from the primary mirror to the secondary mirror. The tertiary mirror lies on the second rotational axis. The first fold mirror redirects the beam path reflected from the secondary mirror to the tertiary mirror. The second fold mirror lies at the intersection point and redirects the beam path reflected from the tertiary mirror along the first rotational axis. (The beam path is described herein in terms of a received beam that is received by the primary mirror of the optical system from an external input, and then is reflected to exit the gimbal along the first rotational axis. Under reciprocal-path principles of optics, the described system is equally applicable to a transmitted beam that is input along the first rotational axis, and leaves the optical system after a final reflection from the primary mirror.)

The primary, secondary, tertiary, and first fold mirrors are all preferably mounted to, and move with, the inner gimbal. The second fold mirror is preferably mounted to, and moves with, the outer gimbal. The outer gimbal typically includes an outer-gimbal bearing having a center opening through which the beam path passes after reflecting from the second fold mirror. The first fold mirror preferably, but not necessary, lies substantially on the third axis or on a locus of points lying in the plane defined by the second rotational axis and the third axis, but not on the first rotational axis or the second rotational axis. The primary mirror is preferably circular with a circular diameter of $D_p$ (see FIG. 3). The tertiary mirror preferably lies outside of the circular diameter $D_p$ so that it does not obscure the primary mirror.

The optical components that are located off the gimbal may be of a wide variety of types. Generally, an optical transceiver is not mounted to either the inner gimbal or the outer gimbal, and intercepts the beam path after it passes along the first rotational axis. The optical transceiver may be an optical transmitter such as a laser whose output beam is conducted to the gimbaled components and thence transmitted outwardly from the primary mirror of the telescope. The optical transceiver may be an optical receiver such as a sensor or a spectrometer, whose input beam is received by the primary mirror and conducted off the gimbal to the light receiver. The optical transceiver may include both transmitting and receiving functions.

In another embodiment, a coude gimbal structure comprises a two-axis gimbal system including an outer gimbal pivotable about a first rotational axis, and an inner gimbal supported on the outer gimbal and pivotable about a second rotational axis which is perpendicular to the first rotational axis and which intersects the first rotational axis at an intersection point. A reflective coude optical system includes a positive-optical-power primary mirror mounted to the inner gimbal. The primary mirror is directed along a third axis passing through the intersection point and lying perpendicular to the first rotational axis and perpendicular to the second rotational axis. Preferably, the primary mirror is circular with a circular diameter $D_p$. A primary-mirror projected path length of a beam path parallel to the first rotational axis does not exceed one-half of $D_p$, and a primary-mirror projected path length of a beam path parallel to the second rotational axis does not exceed one-half of $D_p$. Other compatible features described herein and elsewhere may be used in conjunction with this embodiment.

In yet another embodiment, a coude gimbal structure comprises a two-axis gimbal system including an outer gimbal pivotable about a first rotational axis, and an inner gimbal supported on the outer gimbal and pivotable about a second rotational axis which is perpendicular to the first rotational axis and which intersects the first rotational axis at an intersection point. A reflective coude optical system includes a positive-optical-power primary mirror mounted to the inner gimbal. The primary mirror is directed along a third axis passing through the intersection point and lying perpendicular to the first rotational axis and perpendicular to the second rotational axis. The coude optical system includes an intersection flat fold mirror at the intersection point. Other compatible features described herein and elsewhere may be used in conjunction with this embodiment.

The longer the on-gimbal path length of the coude optics, the greater the increase in the cross-sectional dimensions (i.e., spreading) of the optical beam. The increase in the cross-sectional dimensions is proportional to the field of view of the optical system. The increase in the optical beam size is not of concern in applications such as astronomical telescopes, where the field of view is very small, typically on the order of 0.01 degrees. However, for applications such as earth-surveillance or other scene-surveillance systems, the field of view is typically much larger, on the order of ½-1 degree or more, or about 50-100 or more times the field of view for a typical astronomical telescope. In this case, the increase in the cross-sectional diameter for conventional coude optics is quite large. Other components of the system, such as the diameter of the bearing through which the beam passes, must be increased in size, resulting in increased weight, size, and power requirements of the gimbal structure. With the present approach, the on-gimbal coude path length is decreased substantially, so that beam spreading is reduced and the required enlargements of weight, size, and power requirements of the gimbal system are much smaller. This consideration is of great significance in the design of airborne and space borne gimbaled optical systems.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block diagram of a pointable optical system including on-gimbal and off-gimbal elements;

FIG. 3 is a schematic perspective ray-path drawing of the gimbaled optical system of FIG. 2; and FIG. 4 is an optical prescription for an embodiment of the present approach.

DETAILED DESCRIPTION OF THE INVENTION

Figure 2:
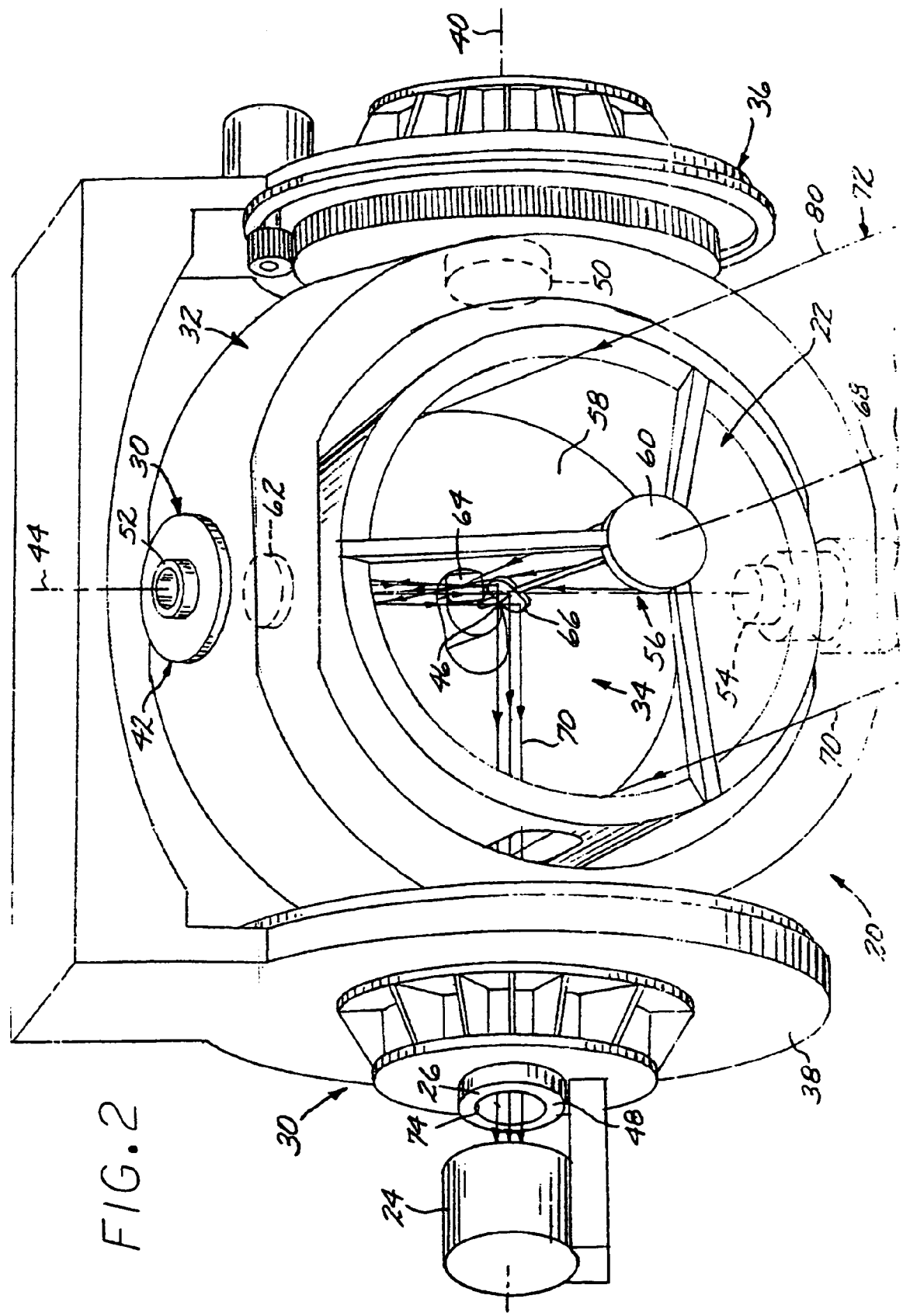
FIG. 2 is a schematic perspective view of the pointable optical system and optical components of a gimbaled telescope.

FIG. 1 depicts a block diagram of one form of an optical system 20. An afocal telescope 22 is mounted on a gimbal structure, so that the afocal telescope may be pointed at objects within a field of regard of the gimbal structure and the afocal telescope 22. In this form, an optical transceiver 24 is so large and heavy, or otherwise has special requirements, that it is not mounted on the gimbal structure and is stationary relative to the movement of the gimbal structure. The off-gimbal optical transceiver 24 may be an optical transmitter such as a laser that beams its power output through the pointable afocal telescope 22; the optical transceiver 24 may be an optical receiver such as a sensor that requires cooling to cryogenic temperatures; or the optical transceiver 24 may include both a transmitter and a receiver. An optical beam link 26 extends between the on-gimbal afocal telescope 22 and the off-gimbal optical transceiver 24 to provide output from the optical transceiver 24 to the afocal telescope 22, or input from the afocal telescope 22 to the optical transceiver 24, or both functions. The optical beam link 26 must provide the proper path from or to the relatively stationary optical transceiver 24 even though the afocal telescope 22 pivots to various angles within its field of regard.

FIG. 2 depicts a coude gimbal structure 30 that comprises the afocal telescope 22, including its gimbal structure 32 and its optical components 34, in relation to the optical beam link 26. FIG. 3 is a ray-path illustration of the optical components 34 of the coude gimbal structure 30 and their relation to the optical beam link 26, but with most of the physical gimbal structure 32 omitted for clarity of illustration.

The coude gimbal structure 30 comprises a two-axis gimbal system 36 including an outer gimbal 38 (which may also be termed a yoke) of the gimbal structure 32 pivotable about a first rotational axis 40, and an inner gimbal 42 supported on the outer gimbal 38 and pivotable about a second rotational axis 44. The second rotational axis 44 is perpendicular to the first rotational axis 40 and intersects the first rotational axis 40 at an intersection point 46.

The outer gimbal 38 is pivotably supported on outer-gimbal bearings 48 and 50. The inner gimbal 42 is pivotably supported on inner-gimbal bearings 52 and 54. One or both of each pair of bearings 48, 50 and 52, 54 may be contained within a rotational drive motor or rotational drive motors for movement about the two rotational axes 40 and 44.

The coude gimbal structure 30 further includes a folded afocal three-mirror anastigmat 56. The folded afocal three-mirror anastigmat 56 has a positive-optical-power primary mirror 58, a negative-optical-power secondary mirror 60, and a positive-optical-power tertiary mirror 62. In the preferred embodiment, the primary mirror 58 is circular with a circular diameter $D_p$, which is substantially the same as the aperture of the primary mirror and of the afocal telescope 22. The tertiary mirror 62 lies on the same side of the primary mirror 58 as the secondary mirror 60. The tertiary mirror 62 preferably lies outside of a cylinder of rays 80 extending to (or from) the primary mirror 58, where the cylinder of rays 80 has a cylindrical diameter of no greater than $D_p$. Stated alternatively, the tertiary mirror 62 is at a greater distance from a third axis 68 that passes through the intersection point 46 and lies perpendicular to the first rotational axis 40 and the second rotational axis 44, than is the outermost of the rays that are incident upon the primary mirror 58. Consequently, there is no projected area of the tertiary mirror 62 onto the primary mirror 58. The tertiary mirror 62 does not obscure the primary mirror 58 and does not obscure any of the light rays. Additionally, there are a first flat fold mirror 64, and a second flat fold mirror 66 that are preferably positioned so that neither of the fold mirrors 64, 66 further obscures the primary mirror 58 beyond the obscuration of the secondary mirror 60. That is, the only effective obscuration of the primary mirror 58 is by the secondary mirror 60.

The mirrors 58, 60, 62, and 64 are all supported from the inner gimbal 42 and rotate as a fixed set about the axis 44. The mirror 66 is supported from the outer gimbal 38 and rotates about axis 40. However, the support structure for the mirrors 58, 62, 64, and 66 are omitted from the drawings to avoid clutter.

The primary mirror 58 and the secondary mirror 60 lie on the third axis 68 passing through the intersection point 46 and lying perpendicular to the first rotational axis 40 and perpendicular to the second rotational axis 44. The tertiary mirror 62 lies on the second rotational axis 44. The first fold mirror 64 preferably does not lie on the third axis 68. The second fold mirror 66 lies at the intersection point 46.

As shown in FIG. 2 and in a ray-path view in FIG. 3, a beam path 70 of an incoming light beam 72 parallel to the third axis 68 is incident upon the primary mirror 58. The beam path 70 reflects from the positive-optical-power primary mirror 58 to the negative-optical-power secondary mirror 60. The beam path 70 reflects from the secondary mirror 60 to the first flat fold mirror 64, which redirects the beam path 70 to be incident upon the tertiary mirror 62. The beam path 70 reflects from the tertiary mirror 62 to the second flat fold mirror 66, which redirects the beam path 70 along the first rotational axis 40. An outgoing beam path initially along the first rotational axis 40 reflects from the mirrors in the opposite order.

The outer-gimbal bearings 48 and 50 are supported from the outer gimbal 38. The outer-gimbal bearing 48 is an annular cylinder in form, with a hollow center opening 74. The beam path 70 passes through the hollow center opening 74 as it travels along the first rotational axis 40 to the optical transceiver 24 after reflecting from the second flat fold mirror 66.

It will be recalled that the primary mirror 58 is preferably circular with a diameter of $D_p$. In this presently preferred embodiment, a primary-mirror projected path length of the portion of the beam path 70 onto the primary mirror 58, measured parallel to the first rotational axis 40, does not exceed one-half of $D_p$ (i.e., one-half of the aperture of the primary mirror 58 and of the telescope 22). A primary-mirror projected path length of the portion of the beam path 70 parallel to the second rotational axis 44 does not exceed one-half of $D_p$. Stated another way, the beam path 70 does not extend all the way across the face of the primary mirror 58, in the segments of the portion of the beam path 70 lying along either the first rotational axis 40 or the second rotational axis 44. Similarly, the cylindrical diameter of the cylinder of rays 80 does not exceed one-half of $D_p$. This geometry shortens the overall length of the beam path 70 between the primary mirror 58 and the transceiver 24, so that the increase in the cross-sectional area of the beam path 70 is limited, even for an optical system with a significant field of view. This limitation on the length of the beam path 70 is a result of the second flat fold mirror 66 positioned at the intersection point 46, and the presence and positioning of the positive-optical-power tertiary mirror 62.

The present coude approach uses an arrangement of two flat fold mirrors and three powered mirrors, as compared with prior coude approaches which typically use 4-5 flat fold mirrors and 2 or more powered mirrors. The present approach results in a coude path length of only about ½ times the aperture diameter of the primary mirror 58. (The "coude path length" is defined as the distance measured along the beam path between the on-gimbal optics pupil that is closest to the inner gimbal axis (if there is more than one pupil) and the outer gimbal axis bearing.) By comparison, prior arrangements of mirrors produced a coude path length of about 2-½ to 4-½ times the aperture diameter. The result of a small coude path length is a small beam diameter (i.e., limited spreading of the beam) as the beam path 70 passes through the center opening 74 of the outer gimbal bearing 48. The small beam diameter allows the bearing structure to be made more accurate, smaller, lighter, and less expensive than the bearing structure of prior approaches. Another important advantage is that the intersection point 46 of the axes 40, 44, and 68 is near the center of gravity of the physical components of the afocal telescope 22. Consequently, the swept volume of the gimbaled afocal telescope 22 is relatively small, and there is a good static balance of the physical components of the gimbaled afocal telescope 22. The drive motors for the gimballing movement may be made small, and counterweights are typically not needed.

These advantages are direct results of the optical arrangement. The folding of the beam path 70 by the first flat fold mirror 64 allows the tertiary mirror 62 to be positioned so that the pupil of the reimaging afocal three-mirror anastigmat 56 is positioned at about the second flat fold mirror 66. The size of the second flat fold mirror 66 may therefore be made as small as possible, which aids in avoiding any obscuration of the primary mirror 58 by the second flat fold mirror 66. The spreading of the beam path 70 between the second flat fold mirror 66 and the outer gimbal bearing 48 allows the coude path length to be only about ½ of the aperture diameter of the primary mirror 58. The beam spreading of the beam proportional to the length of the beam path subsequent to the pupil. Beam spreading between the second flat fold mirror 66 and the outer gimbal bearing 48 in the present approach is consequently small, allowing the center opening 64 of the outer gimbal bearing to be small.

An exemplary optical design embodying the present approach as been prepared. FIG. 4 sets forth the optical prescriptions for the five mirrors 58, 60, 62, 64 and 66 in this design.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coude gimbal structure comprising:
    a two-axis gimbal system including
    an outer gimbal pivotable about a first rotational axis, and
    an inner gimbal supported on the outer gimbal and pivotable about a second rotational axis which is perpendicular to the first rotational axis and which intersects the first rotational axis at an intersection point; and
    a folded afocal three-mirror anastigmat having a positive-optical-power primary mirror, a negative-optical-power secondary mirror, and a positive-optical-power tertiary mirror, a first flat fold mirror, and a second flat fold mirror, wherein the primary mirror and the secondary mirror lie on a third axis passing through the intersection point and lying perpendicular to the first rotational axis and perpendicular to the second rotational axis, and wherein a beam path parallel to the third axis is reflected from the primary mirror to the secondary mirror, the tertiary mirror lies on the second rotational axis, the first flat fold mirror redirects the beam path reflected from the secondary mirror to the tertiary mirror, and the second flat fold mirror lies at the intersection point and redirects along the first rotational axis the beam path reflected from the tertiary mirror.

2. The gimbal structure of claim 1, wherein the primary mirror, the secondary mirror, the tertiary mirror, and the first flat fold mirror are mounted to the inner gimbal, and the second flat fold mirror is mounted to the outer gimbal.

3. The gimbal structure of claim 1, wherein the outer gimbal includes an outer gimbal bearing having a center opening through which the beam path passes after reflecting from the second flat fold mirror.

4. The gimbal structure of claim 1, wherein the primary mirror is circular with a circular diameter $D_p$, and wherein the tertiary mirror lies outside the circular diameter $D_p$ of the primary mirror.

5. The gimbal structure of claim 1, wherein a pupil of the afocal three-mirror anastigmat is positioned at about the second flat fold mirror.

6. The gimbal structure of claim 1, wherein the primary mirror has an aperture diameter, and wherein a coude path length is about ½ of the aperture diameter of the primary mirror.

7. The gimbal structure of claim 1, further including
an optical transceiver that is not mounted to either of the gimbals and intercepts the beam path after it passes along the first rotational axis.

8. The gimbal structure of claim 1, wherein the first flat fold mirror lies on an arc lying in a plane defined by the second rotational axis and the third axis.

* * * * *